United States Patent
Hofmann et al.

(10) Patent No.: US 11,974,123 B2
(45) Date of Patent: Apr. 30, 2024

(54) ENCRYPTED COMMUNICATION BETWEEN AN APPLIANCE AND A DEVICE ON A MOTOR VEHICLE

(71) Applicant: Bayerische Motoren Werke Aktiengesellschaft, Munich (DE)

(72) Inventors: Sven Hofmann, Munich (DE); Josef Wagenhuber, Gerolsbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 314 days.

(21) Appl. No.: 17/427,967

(22) PCT Filed: Jan. 31, 2020

(86) PCT No.: PCT/DE2020/100063
§ 371 (c)(1),
(2) Date: Aug. 3, 2021

(87) PCT Pub. No.: WO2020/177806
PCT Pub. Date: Sep. 10, 2020

(65) Prior Publication Data
US 2022/0030426 A1   Jan. 27, 2022

(30) Foreign Application Priority Data

Mar. 1, 2019 (DE) .................... 10 2019 105 297.1

(51) Int. Cl.
*H04W 12/0471* (2021.01)
*H04L 9/08* (2006.01)
(Continued)

(52) U.S. Cl.
CPC ....... *H04W 12/0471* (2021.01); *H04L 9/0844* (2013.01); *H04L 9/3066* (2013.01);
(Continued)

(58) Field of Classification Search
CPC ... H04L 9/0844; H04L 9/3066; H04L 9/3236; H04L 2209/84; H04W 12/041; H04W 12/0471
See application file for complete search history.

(56) References Cited

U.S. PATENT DOCUMENTS 10,440,014 B1 * 10/2019 Hoyer .................. G06F 21/445
2008/0165955 A1    7/2008 Ibrahim
(Continued)

FOREIGN PATENT DOCUMENTS

EP           2 518 932 A2    10/2012

OTHER PUBLICATIONS

Teo J C M, et al., "An Anonymous DoS-Resistant Password-Based Authentication, Key Exchange and Psuedonym Delivery Protocol for Vehicular Networks", Advanced Information Networking and Applications, 2009. AINA '09. International Conference On, IEEE, Piscataway, NJ, USA, May 26, 2009, pp. 675-682, ISBN: 978-1-4244-4000-9. XP031476166, (eight (8) pages).
(Continued)

*Primary Examiner* — Eric W Shepperd
(74) *Attorney, Agent, or Firm* — Crowell & Moring LLP

(57) ABSTRACT

A motor vehicle stores a first one-way hash of a password and an encrypted value from a second one-way hash of the password. A method for authenticating a device with respect to the vehicle includes the following: a PACE procedure is carried out so that the device and the motor vehicle determine the same session key; the motor vehicle generates a communication key on the basis of the session key and the encrypted one-way hash; and the device generates the communication key based on the session key and the second one-way hash.

6 Claims, 2 Drawing Sheets

(51) Int. Cl.
*H04L 9/30* (2006.01)
*H04L 9/32* (2006.01)
*H04W 12/03* (2021.01)
*H04W 12/041* (2021.01)

(52) U.S. Cl.
CPC .......... *H04L 9/3236* (2013.01); *H04W 12/03* (2021.01); *H04W 12/041* (2021.01); *H04L 2209/84* (2013.01)

(56) References Cited

U.S. PATENT DOCUMENTS

| | | | | |
|---|---|---|---|---|
| 2009/0217031 | A1* | 8/2009 | Kuhls | H04L 63/0823 713/168 |
| 2014/0230027 | A1* | 8/2014 | Cha | H04L 61/302 726/5 |
| 2015/0210287 | A1* | 7/2015 | Penilla | B60W 40/08 701/49 |
| 2015/0294309 | A1* | 10/2015 | Busser | H04L 63/126 705/40 |
| 2015/0367815 | A1* | 12/2015 | Rasal | B60R 25/2045 701/2 |
| 2018/0265040 | A1* | 9/2018 | Nowottnick | B60R 25/24 |
| 2021/0385075 | A1* | 12/2021 | Sullivan | H04W 12/04 |

OTHER PUBLICATIONS

Stanislaw J, et al., "OPAQUE: An Asymmetric PAKE Protocol Secure Against Pre-Computation Attacks", vol. 20190107:165837, Jan. 7, 2019, pp. 1-39, IACR, International Association for Cyrptologic Research, Retrieved from the Internet: http://eprint.iacr.org/2018/163.pdf, XP061027458, (39 pages).

International Search Report (PCT/ISA/210) issued in PCT Application No. PCT/DE2020/100063 dated May 13, 2020 with English translation (six (6) pages).

German-language Written Opinion (PCT/ISA/237) issued in PCT Application No. PCT/DE2020/100063 dated May 13, 2020 (five (5) pages).

German-language Office Action issued in German Application No. 10 2019 105 297.1 dated Oct. 11, 2019 with partial English translation (14 pages).

Technical Guideline TR-03110, "Advanced Security Mechanism for Machine Readable Travel Documents and eIDAS Token,"—Part 3: Common Specifications, Version 2.21, Dec. 21, 2016, pp. 1-105.

Technical Guideline, TR-03110, "Advanced Security Mechanism for Machine readable Travel Documents and eIDAS Token—Part 2," Protocols for electronic IDentification, Authentication and trust Services (eIDAS), Version 2.21, Dec. 21, 2016, pp. 1-35.

* cited by examiner

ENCRYPTED COMMUNICATION BETWEEN AN APPLIANCE AND A DEVICE ON A MOTOR VEHICLE

BACKGROUND AND SUMMARY OF THE INVENTION

The invention relates to encrypted communication between an appliance and a device. The device is in this case in particular located on board a motor vehicle.

Various methods are known for setting up an encrypted communication connection between a first and a second communication partner, some of which also support authentication of the first partner to the second. In this case, at least the second partner is able to verify the identity of the first, such that the connection is able to be set up not with arbitrary partners, but rather with selected partners.

To this end, the first partner usually has to have information that identifies the second partner. Such a method is known as PACE (Password Authenticated Connection Establishment) and may be used for example in order to establish secure communication between an RFID (Radio Frequency Identification) installed in an identity document and a remote computer.

Such methods are however only of limited suitability for use on board a motor vehicle. Unlike the remote computer, it is relatively easy to obtain physical access to a device installed on board a motor vehicle. It is possible to eavesdrop on the communication or the device is able to be manipulated or analyzed. Information, stored in the device, about a communication partner may be used to spoof the identity or a communication key of the second partner.

One object on which the invention is based is that of specifying an improved method for authenticating an appliance to a motor vehicle. The claimed invention achieves this object.

The motor vehicle stores a first one-way hash x of a password p, and an encrypted value V from the second one-way hash y of the password p.

According to a first aspect of the invention, a method for authenticating an appliance to the motor vehicle comprises steps of performing a PACE method in order for the appliance and the motor vehicle to determine the same session key; the motor vehicle generating a communication key on the basis of the session key and of the encrypted one-way hash V; and the appliance generating the communication key on the basis of the session key and of the second one-way hash y.

Determining the session key in the manner described may make it possible to upgrade (augment) the PACE, belonging to the family symmetric to the PAKE (Password Authenticated Key Exchange) methods, to an asymmetric PAKE. The expanded method is also referred to herein as PACE+.

It is possible to establish secure communication between the appliance and the motor vehicle using the PACE+ method. In this case, information stored in the motor vehicle relating to the identity of the appliance may be designed such that it is not possible to derive therefrom the password used by the receiver. The storage of cryptographic information in the motor vehicle is also called provisioning. Theft of the information by an attacker following provisioning may be harmless.

Information may be exchanged in an arbitrary manner on the basis of the determined session key. By way of example, the motor vehicle may be controlled via exchanged information. A locking system or an immobilizer may in particular thereby be deactivated.

The second one-way hash y of the password is preferably encrypted with respect to a predetermined base point of an encryption system. The base point may for example be selected by the appliance.

The appliance may be linked to the motor vehicle if encrypted communication on the basis of the communication key is possible. Virtually any information may then be exchanged between the appliance and the device on board the motor vehicle.

More preferably, encryption is performed on the basis of elliptic curves. This may concern both the PACE method and the determination of V in the course of the provisioning.

It is furthermore preferable for the appliance to comprise a mobile appliance. The appliance may in particular be associated with a user who is permitted to use a predetermined function of the motor vehicle. It is possible to authenticate the user through the exchange of information via the outlined communication connection, so as to make it possible to enable the function. The function may in particular comprise normal operation or use of the motor vehicle.

It is furthermore preferable for the appliance to comprise a personal appliance associated with a predetermined user. The appliance may in particular comprise a mobile telephone (smartphone) that is usually used only by the user.

According to a further aspect of the invention, a device on board a motor vehicle is designed to store a first one-way hash x of a password p and an encrypted value V from the second one-way hash y of the password p; also to perform a PACE method with an appliance in order to determine a session key; to generate a communication key on the basis of the session key and of the encrypted one-way hash V and to conduct communication with the appliance that is encrypted on the basis of the communication key.

According to yet another aspect of the invention, a motor vehicle comprises a device described herein.

An appliance corresponding to the device, described herein, on board the motor vehicle is designed to perform a PACE method with the device in order to determine a session key; and to determine a communication key on the basis of the session key and of a one-way hash y of a password p used for the PACE method.

The appliance and the device on board the motor vehicle are able to conduct encrypted communication on the basis of the communication key.

In order to perform at least part of a method described herein, the appliance and/or the device, respectively a processing device, may comprise a programmable microcomputer or microcontroller and the method may be present in the form of a computer program product containing program code. The computer program product may also be stored on a computer-readable data carrier. Features or advantages of the method may be transferred to the device or the appliance or vice versa.

Embodiments of the invention will now be described in more detail with reference to the appended drawings.

DETAILED DESCRIPTION OF THE DRAWINGS

Figure 1:
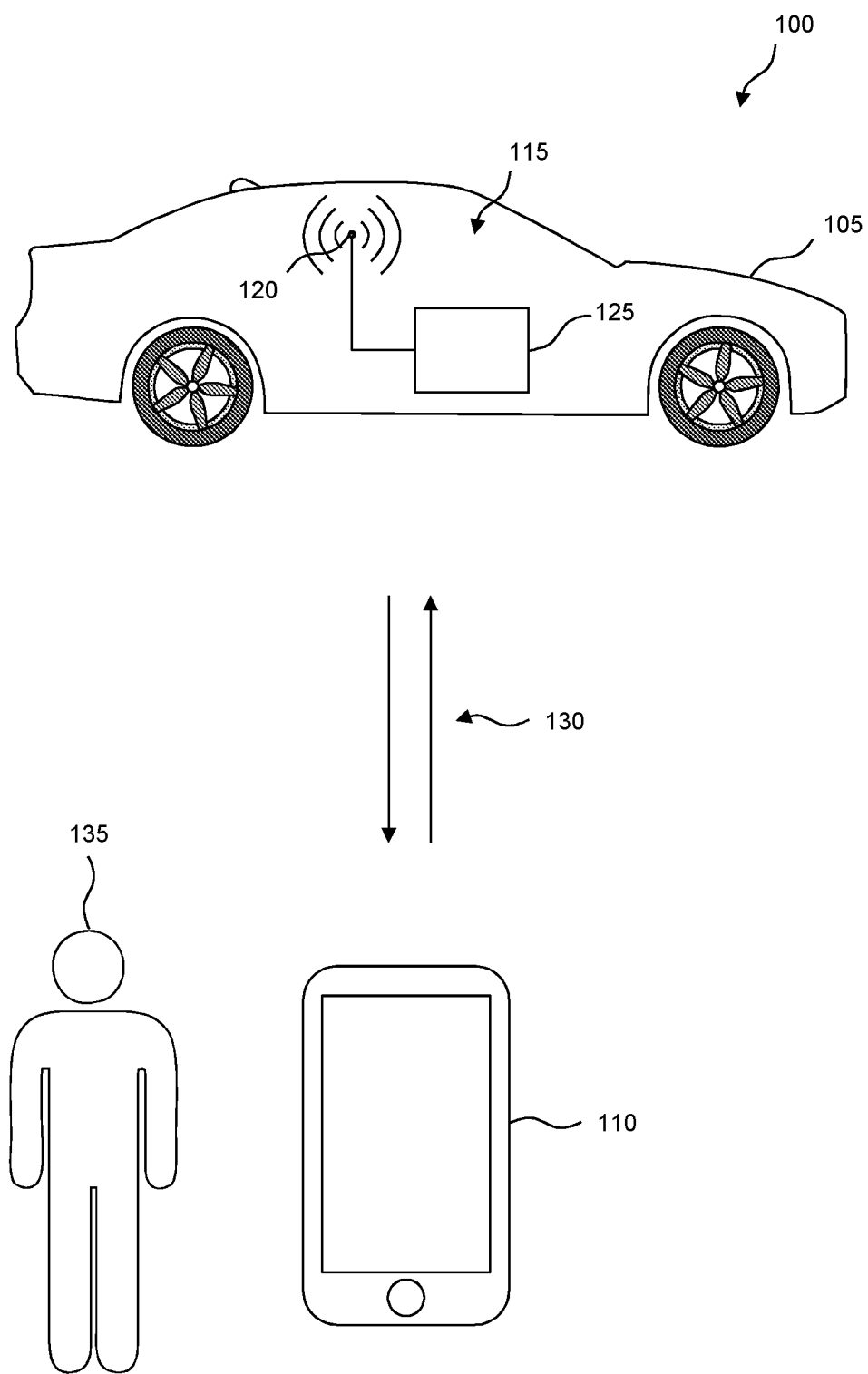
FIG. 1 illustrates a system.

FIG. 1 shows a system 100 that comprises a motor vehicle 105 and an appliance 110. A device 115 is installed on board the motor vehicle 105 and preferably comprises a transmission device 120 and a processing device 125.

The device 115 and the appliance 110 are designed to communicate with one another via a preferably wireless interface 130, for which purpose the device 115 may in particular use the transmission device 120. The interface 130 may be restricted to transmission in a predetermined short range, for example at a distance of typically around 10 meters between the motor vehicle 105 and the appliance 110. In a further variant, the interface may be designed to communicate with the appliance 110 in an interior of the motor vehicle 105.

The appliance 110 is preferably associated with a user 135 and may more preferably comprise a mobile appliance that is designed for mobile use, for example in the form of a mobile telephone, smartphone, tablet computer or laptop computer. The user 135 may be associated with the motor vehicle 105, for example as driver, passenger, owner, renter or lessee.

Communication between the appliance 110 and the device 115 should take place in encrypted form, wherein the encryption should depend on a password that is known to the appliance 110—in particular to the user 135. It is furthermore preferable for information about the password not to be stored in any form in the device 115 from which an attacker could use algorithms to reconstruct the password.

A method described herein may be used to set up encrypted communication. In one embodiment, the appliance 110 may thereby be authenticated to the device 115, or the user 135 may be authenticated to the motor vehicle 105. The use of a function may be enabled only after successful authentication.

Figure 2:
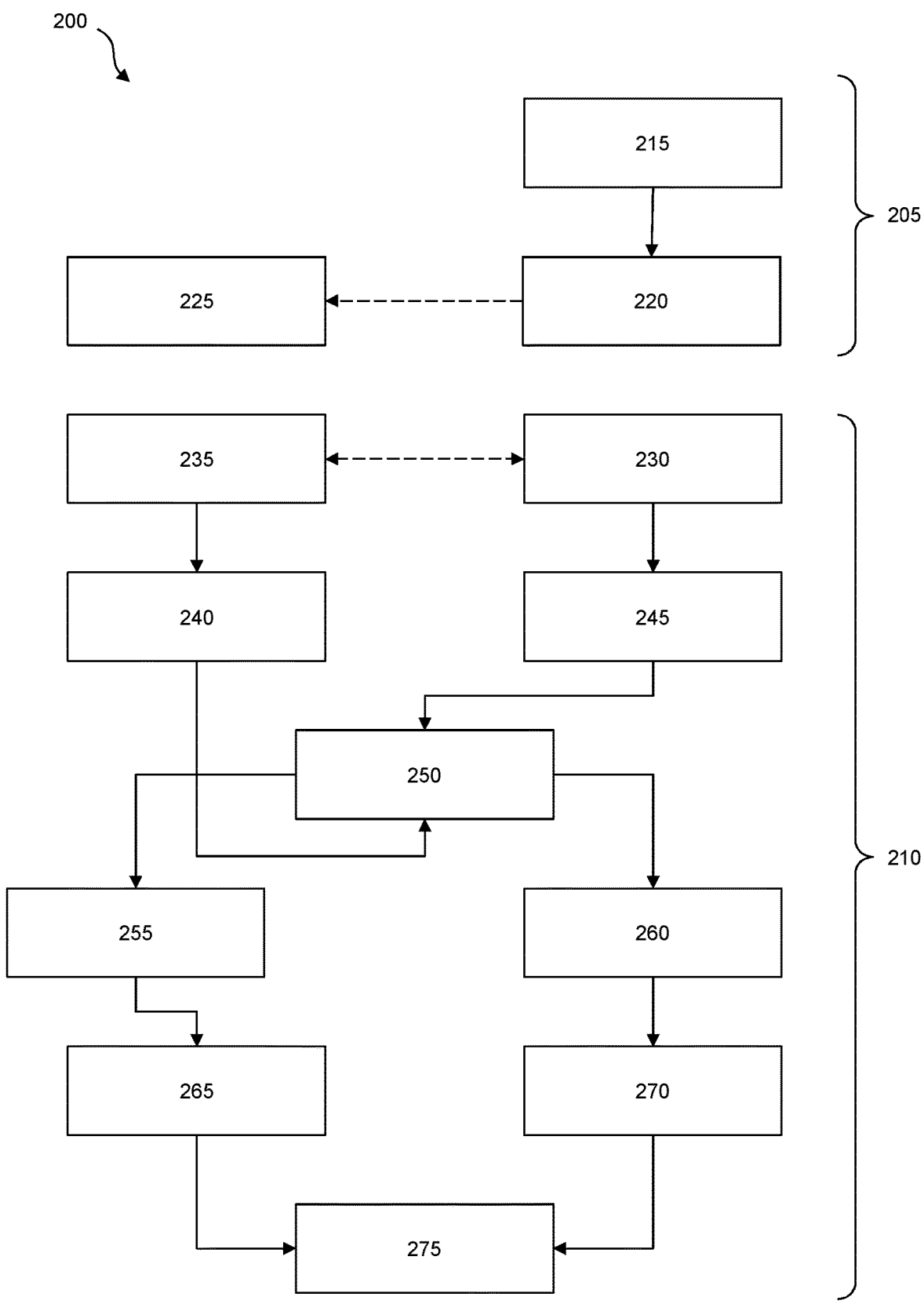
FIG. 2 illustrates a flowchart of a method.

FIG. 2 shows a flowchart of a method 200 for encrypted communication between an appliance 110 and a device 115 that is preferably installed on board a motor vehicle 105. The method 200 may in particular be performed by way of elements of the system 100.

Use is made below of a formula syntax in which a lower-case Latin letter corresponds to a number and un upper-case Latin letter corresponds to a point on an elliptic curve that is used for encryption or decryption. A randomly selected character string for increasing entropy when forming a one-way hash is also referred to as a salt and abbreviated here as s.

By way of example, the left-hand side of FIG. 2 shows steps that are preferably performed by the motor vehicle 105 or the device 115, and the right-hand side of FIG. 2 shows steps that are preferably performed by the appliance 110 or the user 135. A step shown in the middle may concern both sides.

A first section 205 of the method 200 relates to the provisioning, that is to say the storage of information that is required for subsequent authentication between the communication partners 110 and 115. A second section 210 relates to the negotiation or creation of an encrypted communication connection between the appliance 110 and the device 115. Both sections 205, 210 may also be understood to be stand-alone methods.

With reference to the first section 205, in a step 215, it is possible to determine a password p that the user 135 should use subsequently for authentication. The user 135 may select an arbitrary password p or a password p may be proposed and be able to be accepted by the user 135. The password p preferably comprises a string of in particular alphanumeric characters that the user 135 may note and input into the appliance 110 by way of a real or virtual keypad. An operation * represents a multiplication of a number by a point on an elliptic curve, and an operation * represents a multiplication of two numbers. $\oplus$ denotes an addition and $\ominus$ denotes a subtraction on elliptic curves.

In a step 220, on the basis of the password, a first one-way hash $x=H(s,p)$ may be determined by way of a first one-way hash function H and a second one-way hash $y=G(s,p)$ may be determined by way of a second one-way hash function G. The second one-way hash y is preferably encrypted by way of a selected generator or base point $V=y*G$. These operations may be performed by the appliance 110 or by an external entity that is preferably not located on board the motor vehicle 105. In a step 225, x and V, the salt s, and an identification I of the user 135 are preferably stored in the device 115.

With reference to the second section 210, a PACE (Password Authenticated Connection Establishment) method, known per se, is first of all performed in steps 230 to 260 and comprises an authentication and a secure key exchange in order to set up a cryptographically secure communication connection. The PACE method is described in more detail in technical guideline TR-03110 of the German Federal Office for Information Security (BSI). PACE belongs to the family of Password Authenticated Key Exchange (PAKE) protocols. Following steps 265 to 275 of the second section 210 give rise overall to an enhanced (augmented) PAKE method, which is also referred to herein as PACE+.

Considered in more detail, in a step 230, the appliance 110 may select and encrypt a random number a: $A=a*G$. The encrypted random number A is preferably transmitted, together with a salt s, to the device 115. In the opposite direction, in step 235, the device 115 may select and encrypt a random number b: $B=b*G$. The encrypted random number B is preferably transmitted, together with a salt s, to the appliance 110. The received information on both sides may be mapped in steps 240 and 245 to a generator of the mathematical group that is used: $T=a*B=(a \cdot b)*G=(b \cdot a)*G=b*A$.

In a step 250, the actual key exchange preferably takes place. To this end, the user 135 may enter the password p into the appliance 110 and the one-way hash $x=H(s,p)$ may be determined. A selected random number c may be encrypted on the basis of x: $C=Enc_x(c)$. The encrypted random number C may then be transmitted to the device 115 on board the motor vehicle 105.

The device 115 may decrypt the received random number: $c=Dec_x(C)$. In this case, use is made of a decryption $Dec_x$ that corresponds to the encryption $Enc_x$ and is based on the one-way hash x. The device 115 and the appliance 110 may then each determine a temporary generator point D: $D=c*G \oplus T$. On the basis of D, it is then possible to come to a Diffie-Hellman agreement.

The appliance 110 may determine a further random number e that is able to be encrypted with D: $E=e*D$. The device 115 may determine a further random number f that is able to be encrypted with D: $F=f*D$. The determined encrypted random numbers E and F are then preferably transmitted to the respective other communication partner, that is to say E is transmitted from the appliance 110 to the device 115 and F is transmitted from the device 115 to the appliance 110. The device 115 may then determine a first session key $K_H=e*F=(e \cdot f)*D$ in step 255 and the appliance 110 may determine a second session key $K_U=f*E=(f \cdot e)*D$ in step 260. It holds true in this case that: $K=K_U=K_H$.

Should it not be possible at the receiver to decrypt a message encrypted by way of K and transmitted between the communication partners 110, 115, then the second section 210 of the method 200 is generally considered to have failed and may be terminated or restarted.

Following the PACE method of steps 230 to 260, in a step 265, the device 115 may form a communication key sk=H(x,T,D,K,b*V). This is possible because, in the first section 205, x and V were stored in the device 115. The appliance 110 may form a communication key sk=H(x,T,D,K,y*B). To this end, the device 110 may use the encrypted random number B from the Diffie-Hellman key exchange.

The two communication keys sk that are formed are identical, since it holds true that: y*B=y*(b*G)=(y·b)*G=(b·y)*G=b*(y*G)=b*V.

These additional operations convert the known PACE method into an enhanced PAKE protocol, since the device 115 uses only V, while the appliance 110 requires the unencrypted value y that has to be formed on the basis of the password p.

In a following step 275, communication may be performed between the device 115 and the appliance 110 on the basis of the communication key sk. If this is not possible, then the second section 210 of the method 200 may be considered to have failed. The communication may comprise setting up a connection, which is also referred to as session, wherein the process of connecting may also be referred to as pairing.

The complexity of the proposed second section 210 of the method 200 is negligible. The device 115 needs to perform six scalar multiplications or four scalar multiplications and one bilinear scalar multiplication in order to determine the communication key sk. The outlay for the appliance 110 is the same.

REFERENCE SIGNS 100 system
105 motor vehicle
110 appliance, mobile appliance
115 device
120 transmission device
125 processing device
130 interface
200 method
205 first section
210 second section
215 determine password
220 determine hashes
225 store hashes
230 determine, encrypt and transmit nonce
235 determine, encrypt and transmit nonce
240 map nonce to generator
245 map nonce to generator
250 Diffie-Hellman key exchange
255 derive session key
260 derive session key
265 derive communication key
270 derive communication key
275 communication/pairing

What is claimed is:

1. A method for authenticating an appliance to a motor vehicle, wherein the motor vehicle stores a first one-way hash of a password, and an encrypted value from a second one-way hash of the password, the method comprising:
   performing a PACE (Password Authenticated Connection Establishment) method in order for the appliance and the motor vehicle to determine a same session key;
   generating, by the motor vehicle, a communication key based on the session key and the encrypted value;
   generating, by the appliance, the communication key based on the session key and the second one-way hash; and
   conducting communication between the motor vehicle and the appliance, wherein the communication is encrypted based on the communication key.

2. The method according to claim 1, wherein the second one-way hash is encrypted with respect to a predetermined base point of an encryption system.

3. The method according to claim 1, wherein the appliance is linked to the motor vehicle when encrypted communication based on the communication key is possible.

4. The method according to claim 1, wherein the encryption using the communication key is performed based on elliptic curves.

5. The method according to claim 1, wherein the appliance comprises a mobile appliance.

6. The method according to claim 1, wherein the appliance comprises a personal appliance associated with a predetermined user.

* * * * *